Patented Sept. 12, 1950

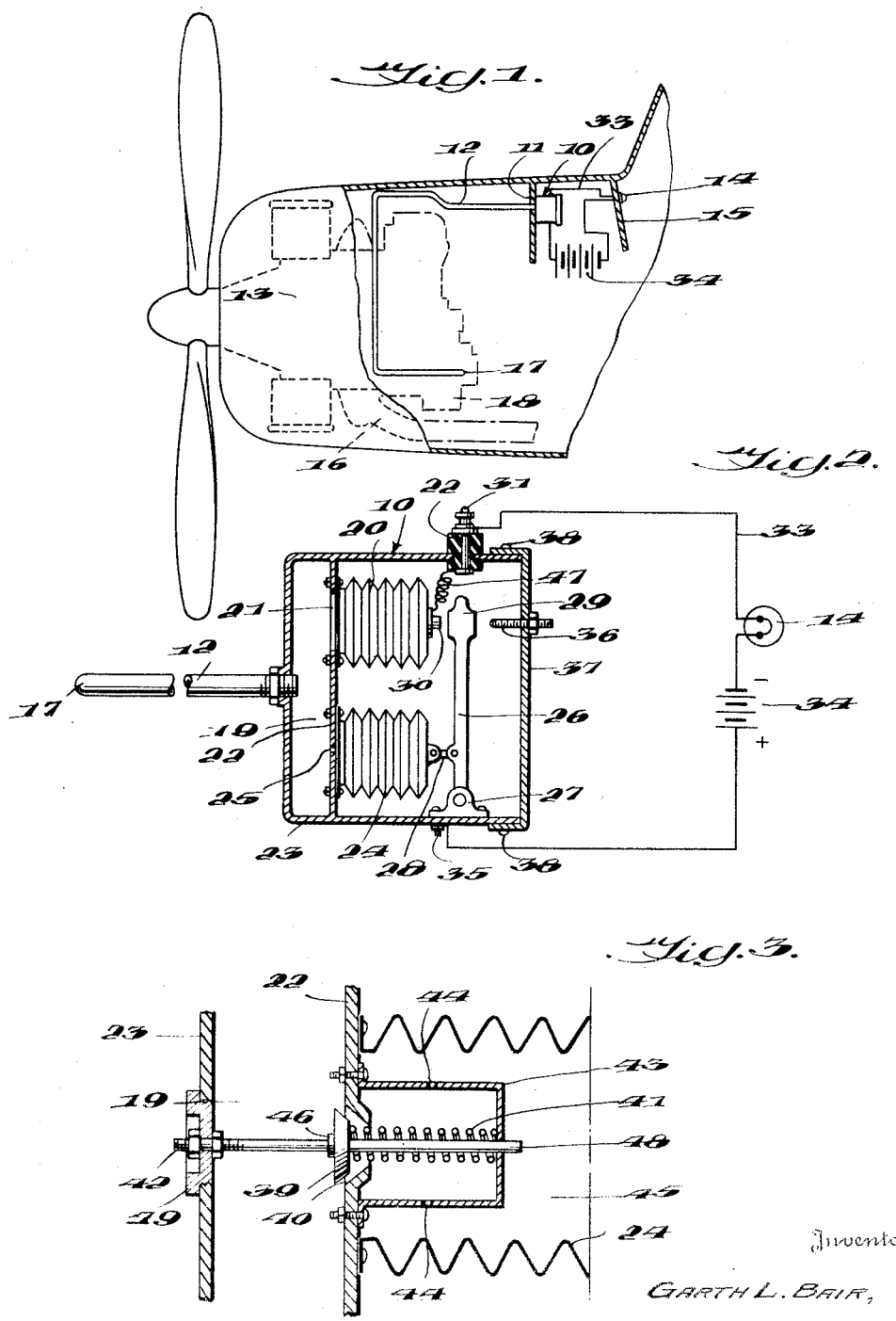

2,522,248

UNITED STATES PATENT OFFICE 2,522,248

FIRE-DETECTING SWITCH

Garth L. Bair, Middle River, Md., assignor to The Glenn L. Martin Company, Middle River, Md., a corporation of Maryland Application September 13, 1946, Serial No. 696,721

13 Claims. (Cl. 200—140)

My invention relates to an improved fire detection system and more particularly to a system capable of repeat operation over various ranges of sudden or prolonged temperature rises.

In many applications of fire detection devices it is extremely desirable that such devices be capable of withstanding high operating temperatures without giving a false alarm and yet be sufficiently sensitive as to indicate the possibility of fire before a fire develops. Such an application is that of an aircraft nacelle where high operating temperatures are common and yet where indication of sudden rises in temperature resulting from malfunctioning of the power plant or its accessories are desired so that remedial steps can be taken in time to avert fire. If such a sudden rise in temperature goes undetected for a relatively short period of time, fire with disasterous results may be expected to occur. Therefore, a system that will operate under ordinary high temperatures without giving alarm or without suffering ill effect as to impair its ability to respond in case of a sudden rise in temperature prior to the actual presence of flame has great utility. Other requisites are that such a system be light in weight and sufficiently rugged as to provide efficient dependable service under extremely adverse operating conditions.

Prior to this invention, none of the conventional systems have been capable of being repeatedly operated over wide ranges of temperature under fire conditions while retaining sufficient sensitivity to reflect a quick temperature rise indicative of an impending fire. Many attempts have been made to adapt conventional detecting systems to aircraft, particularly of the flame detecting type, and it is obvious that such systems are limited in coverage and are incapable of functioning as indicators of sudden rises in temperatures prior to actual fire so as to enable the pilot to determine the cause of the malfunctioning of the power plant, let alone take steps to remedy the condition.

The present invention provides a light-weight, quick temperature rise detecting mechanism for aircraft in which pressure sensitive chambers are placed in communication with a hollow detecting tube formable to the contour of the power plant assembly to reach the areas to be guarded and a visible indicator ready of mounting on the pilot's instrument panel capable of indicating sudden or excessive pressures imposed on the chambers.

It is among the objects of my invention to provide a detecting system capable of being adjusted to various operating ranges of temperature for repeat indication of excessive or sudden rises in temperature over a predetermined temperature range.

It is a further object of my invention to provide a closed fire detecting system having a pressure tube capable of being extended to the various danger points of an aircraft power plant.

A further object is to provide an economical, light-weight system for use as standard equipment on an aircraft capable of repeat operation irrespective of varying operating conditions.

Another object of my invention is to provide a rugged detecting system for aircraft capable of dependable operation even when subjected to severe vibration and accumulations of water, oil, grease and like substances ordinarily harmful to operating devices.

A still further object is to provide a system capable of adaptation to a wide range of applications having different operating temperature ranges.

Other objects of this invention will become apparent from the following description when taken in conjunction with the accompanying drawing in which like numerals refer to like parts.

In the drawing:

Figure 1 is a view of perspective showing the complete detecting system installed in an aircraft.

Figure 2 is a fragmentary sectional view of the control switch showing cooperative arrangement of the pressure indicating mechanism.

Figure 3 is a fragmentary view of a modified form of control switch provided with orifice volume adjustment.

Referring to the drawings in detail, I have illustrated in Figure 1 the detecting system of my invention installed in an aircraft which comprises a pressure sensitive control switch 10 affixed to and supported by the firewall 11 through which the detecting tube 12 extends forwardly into close proximity to the power plant assembly 13 with an indicating light 14 located on the pilot's instrument panel board 15 arranged for operation from a source of electrical supply 34, consisting of a battery or other suitable supply means, upon closing of an electrical circuit through the control switch.

It is one of the advantages of this system that the detecting tube 12 consists of a hollow tube closed at one end with the other end opening into the main air chamber of the control switch 10, illustrated in Figures 1 and 2 and hereinafter described in detail, that is practically indestructible. Most satisfactory results have been attained by the use of tubes formed of light stainless steel tubing, or similar material, capable of being bent and shaped to meet the demand for strategic locations adjacent the engine accessories where most high temperatures resulting in fires originate. As illustrated in Figure 1, tube 12 extends forwardly through the firewall 11 to a position spaced from the accessory section of the power plant 13 and thence downwardly following generally the contour of the exhaust ring and the exhaust muff 16 with the closed end 17 positioned adjacent the oil pump 18 of the accessory group. The form and functional operation of the tube 12 is such that it may be readily supported by the conventional support brackets common to aircraft design.

Tests show that most fires in aircraft powerplants are caused by the ignition of combustible fluid or vapors present within the cowling. Presence of the vapors is usually due to the rupture of fuel or oil lines, failure of engine parts, leakage around the engine and pump seals, or leaks in the oil line, allowing these volatile fluids to be dropped or thrown onto the engine parts that normally operate at high temperatures or surfaces that have become abnormally overheated due to failure of some vital part. The leakage is usually slight at first so that the resultant fire is relatively small until structural damage is done to an extent sufficient to release greater quantities of volatile matter. Therefore, if a fire or abnormal temperature can be detected in the first stages, remedial steps can often be taken by the pilot, such as shutting off the fuel supply line to that particular power plant which will allow the engine to cool, or a fire, if started, to be snuffed out before serious damage is done to the aircraft. By the novel arrangement of a detecting tube located close to the danger areas and the pressure-sensitive switch of this invention capable of picking up quick surges of pressure developed in the tube by abnormal rises in temperature of the operating parts or by combustion I have found that it is possible to pick up and indicate these pressure rises, either as quick rises within certain predetermined working ranges or, as an excessive temperature that exceeds a maximum permissible working temperature.

The tube 12, having a closed end 17, provides an air chamber of a predetermined capacity opening into the main chamber 19 of the control switch 10 adapted for mounting on the firewall 11 of an aircraft. Chamber 19 of the control switch 10 is provided with a relatively large opening 21 connecting the interior of an expansible bellows 20 with the main air chamber 19. Bellows 20 is of conventional design and is mounted on back wall 22 of chamber 19 positioned to extend across the interior of case 23 of control switch 10. A second, or bottom, expansible bellows 24 is placed below bellows 20 and positioned over a small orifice 25 formed in back wall 22 to provide a passage of predetermined air flow capacity leading from chamber 19 into the interior of the second bellows 24.

In front of and aligned with both bellows is a pivoted arm 26 arranged with one end fulcrumed adjacent the bottom of case 23 in fixture 27 adapted to limit movement of the arm 26 to that of pivoted motion toward and away from the bellows. Arm 26 is linked to the second bellows 24 by a link 28 adapted to move arm 26 as the bellows is caused to expand or contract as acted upon by changes in the volume of air within the bellows. The length of arm 26 is such that with one end pivoted in fixture 27 the opposite end 29 is positioned opposite bellows 20 and in alignment with an electrical contact point 30 formed on the extendable end of the bellows. The distance between the pivot point of fixture 27 and the attachment point of link 28 is proportioned and arranged so that a relatively slight movement of the second bellows 24 linked to arm 26 by link 28 will produce a relatively large movement of the opposite end 29 of the arm adjacent contact point 30 carried by the first bellows 20. The end 29 of arm 26 is formed as a double contactor adapted for limited movement between contact point 30 carried by bellows 20 and a stop screw 36 mounted in cover 37 of the control switch. The function of stop screw 36 is to provide adjustable means of limiting the maximum movement of arm 26.

Electrical contact point 30 carried by bellows 20 is provided with a flexible electrical conductor 47 connecting contact point 30 with an electrical connector 31 insulated from the control switch case by a rubber fitting 32, or like insulating means. Wires 33 provide an electrical circuit connecting from connector 31 to the signal light 14 arranged for installation on the instrument panel board 15 and thence through an electrical supply source 34 shown as a battery with the positive side grounded to the control switch case 23 by a bolt 35, or similar means, forming an electrical connection with the end of contact arm 26. The arrangement of cover 37 held in place by screws 38 over the end of the switch housing, or case 23, provides for seal means against changes in atmospheric pressure.

The operation of the detecting device is that as air in tube 12 is caused to expand gradually by a gradual increase in temperature acting thereon, such expansion causes simultaneous expansion of bellows 20 and 24. Expansion of bellows 20 effects a movement of contact 30 toward the end 29 of arm 26 and the movement of the second bellows 24 tends to move arm 26 linked thereto away from contact 30. This cooperative arrangement of the bellows in connection with the movement of the contact arm is utilized to allow for a gradual increase in the operating temperature as can be expected during a proper operation of the power plant. Such gradual movement of arm 26 away from expanding bellows 20 will be maintained until a maximum normal expansion is reached. The parts are so arranged and proportioned that no contact of contact 30 will be made with arm 26 as long as a predetermined maximum operating temperature is not exceeded. The limit of an allowable maximum temperature is determined by the adjustment of stop screw 36 so that when a certain predetermined temperature rise is exceeded movement of arm 26 is stopped and contact 30 will be brought into contact with the arm end 29 closing the electrical signal light circuit so as to warn the pilot that fire is present or imminent. It is understood, of course, that this system can be readily utilized to provide protection at different locations, such as for multimotored aircraft, by adding additional detecting tubes with or without separate control switches as conditions warrant.

Tests show that the maximum air temperatures attained during the normal operation of an airplane power plant in both the power and accessory sections is that of approximately 300° F., and that this temperature will vary under malfunctioning conditions of from 700° F. in the accessory compartment to 1800° F. in the power plant section, and that in direct contact with flame, temperatures of 2000° F. will occur. The customary exhaust stack temperatures incurred during normal operating conditions is found to be approximately 1150° F., whereas under malfunctioning conditions this temperature will rise to 1400° F., and it has been further determined that oil will withstand temperatures up to 1400° F. without giving trouble, but if allowed to drop upon a heated surface so as to create a vapor, that the resultant vapor will ignite at 750° F. All of which indicates that a detector to provide efficient operation must be capable of withstanding a gradual increase in temperature up to 1400° F. without showing alarm, whereas a sudden rise anywhere within the range of approximately 300° to 1400° F. should give occasion for alarm.

The present detecting system will respond to such a sudden rise of temperature as predetermined and provided for by the restrictive nature of orifice 25 that determines the speed with which the second bellows 24 will respond to the expansion of air directly effecting the movement of bellows 20. The second bellows 24 being linked to the arm 26 will move the arm away from bellows 20 relatively slowly due to the restriction placed upon the passage of air into the second bellows as determined by the size of the orifice 25 compared to the unrestrictive size of opening 21 into the first bellows 20. This rate of entrance is determined so as to allow the air pressure in each of the bellows 20 and 24 to equalize during normal operations, but is so restricted that when subjected to abnormal increases in expansion due to overheating contact 30 will move toward the end 29 of arm 26 and make contact therewith before arm 26 can be moved away from contact 30 by reason of the sloweddown action of the second bellows 24. The function of orifice 25 is to act as a stop gate or metering device to limit the speed with which expanded air may be passed from the main chamber 19 into the second bellows 24 while the first bellows 20 is allowed to expand normally by reason of the unrestricted opening 21 formed in wall 22 providing for passage of air from the main chamber into bellows 20. This arrangement of the bellows and control arm 26 is utilized to effect a control-switch operation by which an immediate expansion of the first bellows 20 in excess of the expansion of the second bellows 24 brings contact 30 into contact with end 29 of arm 26, closing the electrical circuit 33 so as to energize signal light 14. This action of the detector system is designed to operate within a few seconds which will give ample warning to the pilot so as to enable him to shut off the oil and gasoline supply to the power plant in trouble and take any other fire prevention steps necessary. After the remedial acts of the pilot have taken effect and the temperature has returned to normal the signal light will be automatically extinguished by opening of the contacts and the system placed in readiness for a repeat operation. The stop adjustment screw 36 provides for adjustment of the system to any maximum temperature desired which, as aforestated, will customarily be in excess of 1150° F. to allow for the highest build-up of the exhaust stack temperatures normally to be expected.

In those types of installations where it is found desirable to maintain a large capacity of air in the detector tube 12, it is recommended that the admission of air to the second bellows 24 be adjustable, and this type of adjustable valve is illustrated in Figure 3 shown as a modification of orifice 25 in that a poppet valve 39, carried on a rod 48 mounted in an access plug 49 sealably screw-fitted in housing wall 23 opposite the opening into the second bellows, is positioned for seating in seat 40 of chamber wall 22 to close the air passage leading into the bellows. Poppet valve 39 is held in place adjacent the valve opening by a stop ring 46 mounted on rod 48 positioned with one end supported by a spider 43 provided with openings 44 communicating with the interior of bellows 24. The mounting is such that for free passage of air therethrough, poppet valve 39 is urged to an open position, against abutment formed by stop ring 46, spring 41 encircling the rod 48 between the valve and the spider 43. The end 42 of rod 48 carried by plug 49 is threaded to provide an adjusting means to vary the extent to which the valve may be opened to allow for different limits of normal expansion over which the detecting system is intended to operate. The tension of spring 41 is such as to hold the valve open under normal conditions and yet allow the valve to seat upon a quick expansion of the air in the tube 12 reflected by air movement in chamber 19, causing the expansion of the second bellows 24 to be slower than that of the first bellows 20 and effect closure of the alarm circuit as previously discussed. Under normal operating conditions with gradual rises of temperature and resultant gradual increases of pressures in chamber 19 the air will slowly pass between the valve 39 and seat 40 through openings 44 into the interior 45 of the second bellows 24 resulting in the gradual movement of arm 26 away from contact 30 to allow for the normal expansion of the first bellows 20 without closing the alarm circuit. In certain installations where long runs of tubing between the control switch and the areas to be guarded are necessary, the system may be filled with a gas having a greater co-efficient of expansion than ordinary air so as to provide for greater sensitivity. The use of such gas is to be avoided on ordinary installations as use of gas would make the possibility of leakage an element to be guarded against, whereas with my system, arranged to operate with ordinary air, small leakages have little or no effect on the operations described above.

For the purpose of this description I have described and illustrated the use of this invention as a fire detecting system for aircraft, however, it is to be understood that the device may be suitably used in other installations where it is highly desirable to have an alarm system capable of detecting sudden rises in temperature over a wide range of operating temperatures.

As other embodiments and variations may be made of this invention and as changes may be made in the embodiment hereinbefore described, it will be understood that all matter described herein or shown in the accompanying drawings is to be considered as illustrative only and not in the limiting sense.

I claim as my invention:

1. A circuit closing device actuated only in response to a sudden increase in temperature of a medium comprising a pair of devices movable in response to pressure changes caused by expansion and contraction of the medium, said devices being mounted in a casing sealed against atmospheric pressure, one of said devices including means to effect a slower rate of movement thereof than the other in response to medium expansion, a switch for an electric circuit having contacts movable toward and away from each other, said one device being operatively connected to one of said contacts to move it away from the other contact in response to medium expansion, said other device being operatively connected to the other contact to move it toward said first named contact in response to medium expansion, whereby, rapid medium expansion effects engagement of the switch contacts and gradual medium expansion prevents engagement of the switch contacts.

2. A circuit closing device actuated only in response to a sudden expansion of a medium indicative of a rise in temperature of said medium comprising a pair of devices movable in response to an expansion of the medium, one of said devices including means to effect a slower rate of movement thereof than the other in response to medium expansion, a switch for an electric circuit having contacts movable toward and away from each other, said one device being operatively connected to one of said contacts to move it away from the other contact in response to medium expansion, said other device being operatively connected to the other contact to move it toward the first named contact in response to medium expansion, whereby, rapid medium expansion effects engagement of the switch contacts and gradual medium expansion prevents engagement of the switch contacts.

3. A circuit closing device actuated only in response to a sudden rise in pressure of a medium indicative of a rise in temperature of said medium comprising a pair of devices comprised of expansible bellows having movable ends movable in response to pressure changes caused by expansion and contraction of the medium, one of said bellows including means to effect a slower rate of movement of the end thereof than the end of the other bellows in response to medium expansion, a switch for an electric circuit having contacts movable toward and away from each other, the end of said one bellows having a connecting means operatively connected to an arm pivotally mounted to move one of said contacts away from the other contact in response to medium expansion, the end of said other bellows being operatively connected to the other contact to move it toward said first named contact in response to medium expansion, whereby, rapid medium expansion effects engagement of the switch contacts and gradual medium expansion prevents engagement of the switch contacts, and a rigid housing forming with said bellows an airtight chamber separated from said medium for isolating said bellows from external changes in pressure.

4. Fire detecting apparatus actuated by a rise in pressure of a medium indicative of a rise in temperature of said medium comprising a housing having a plenum chamber, a pair of devices movable in response to pressure changes caused by expansion and contraction of said medium in said plenum chamber, one of said devices including means for retarding the movement thereof in response to said expansion and contraction, contacts movable toward and away from each other associated with said devices, said one device being operatively connected to one of said contacts to move it away from the other contact in response to pressure developed in the medium, said other device being operatively connected to the other contact to move it toward said first named contact in response to pressure developed in said device, whereby, rapid expansion of the medium effects engagement of the contacts and gradual expansion prevents engagement of the contacts.

5. In a fire detecting system of the type having a tube placed adjacent areas susceptible to temperature changes and containing a thermally-responsive pressure medium, the pressure of which is affected by said temperature change; a pair of expansible chambers in communication with said tube, each of said chambers having an end movable in response to pressure changes, one of said chambers being provided with an expansion control means to effect a slower rate of expansion in said one chamber relative to the other chamber, a switch for an electric circuit, said switch having one contact carried by the end of a pivoted lever adapted for movement over a given arc and a second contact arranged for contact therewith, connecting means between said lever and said one chamber end to effect movement of the one contact away from the second contact in response to a controlled rate of expansion of the chamber, the second contact being operatively connected to the other of said chambers for movement toward the first named contact to effect contact therewith when the rate of pressure rise exceeds a predetermined rate, and an adjustable stop means limiting movement of said lever to insure engagement of said contacts at a predetermined pressure of said medium.

6. In a fire signaling device actuated only in response to a rise in pressure of a medium within a chamber indicative of a rise in temperature of said medium, an air-tight housing having a common wall with said chamber, a pair of expansible bellows mounted on the common wall communicating with the chamber, said bellows extending into the housing and having their free ends spaced from said wall, a contact point connected to and moved by the free end of one of said bellows, the second expansible bellows having a metering orifice, constituting its sole communication with said chamber, and adapted to effect a predetermined rate of flow between said second bellows and the chamber, a second contact point aligned with the first named contact and adapted to be engaged thereby on rapid expansion of the first bellows, and connecting means between the second bellows and the second contact point adapted to move said point away from the first contact point in response to expanding movement of the second bellows.

7. A pressure actuated switch for controlling the electrical signalling circuit of fire detecting apparatus of the type having a closed gas-filled system including an elongated tube, comprising a plurality of pressure sensitive compartments in communication with the tube having movable end walls positioned and arranged for associated movement on expansion of the gas in the system, a movable contact arm pivotally mounted adjacent to and connected for movement with the end wall of one of said compartments, a flow restricting passage placed between the tube and said one compartment, a second contact operable by the movable wall of a second compartment in alignment with the said contact arm and adapted for actuation of said second contact into engagement with said contact arm upon movement of the compartment wall as effected by expansion of the gas on a sudden increase in temperature therein.

8. A circuit closing device for use in an electrical circuit of a fire signaling system actuated only in response to a sudden increase in pressure of a medium indicative of a rise in temperature of said medium, comprising a plenum chamber placed in communication with the pressure medium having a pair of expansible bellows in communication with said chamber, a switch arm pivotally mounted in alignment with said bellows, a contact point carried by one of said bellows adapted to make contact with said pivoted switch arm upon expansion thereof, a stop means mounted adjacent the switch arm adapted to limit movement of the switch arm, a link connecting the end of the other bellows to the switch arm to maintain the arm out of engagement with the first contact under gradual expansion of both bellows, a flow restricting means placed between the plenum chamber and second bellows for restricting the medium passage thereto to retard movement of the switch arm during rapid expansion of the medium in the chamber.

9. Fire detecting apparatus including a rigid tube filled with a thermally expansible pressure medium, an electric switch, expansion means in communication with said tube and forming therewith a closed fluid system and responsive to an increase in pressure of said medium to actuate said electric switch, and a rigid air-tight housing forming a chamber isolated from said closed fluid system and surrounding said expansion means for isolating the closed fluid system from the effects of external changes in pressure.

10. Fire detecting apparatus including switch means, a closed fluid system for actuating said switch means, and consisting of a rigid hollow portion having its interior filled with a thermally expansible pressure medium and an expansible portion in fluid communication with the interior of said rigid portion, and responsive to an increase in pressure of said medium to actuate said switch means, and means forming with the exterior of said rigid portion, a rigid air-tight housing forming a chamber isolated from said closed fluid system and surrounding said expansible portion for isolating the closed fluid system from the effects of external changes in pressure.

11. A fire detecting system having a closed fluid system filled with a thermally expansible pressure medium, a pair of expansion devices forming part of said closed fluid system, one of said expansion devices including means limiting the rate of expansion thereof, a switch including a set of contacts, one of said contacts being movable by expansion of said one expansion device away from the other of said contacts, and the other of said contacts being movable by expansion of said other expansion device toward said one contact whereby closure of said switch contacts depends at least in part on the rate of pressure increase in said closed system, and a rigid air-tight housing surrounding said expansion means for isolating the closed fluid system from the effects of external changes in pressure.

12. A fire detecting apparatus having a closed fluid system filled with a thermally expansible pressure medium, a normally open electric switch, expansion means forming a part of said closed fluid system and responsive to an increase in pressure of said medium to close said electric switch and a rigid air-tight housing forming a chamber isolated from said closed fluid system and surrounding said expansion means for isolating the closed fluid system from the effects of external changes in pressure.

13. A fire detecting apparatus having a closed fluid system filled with a thermally expansible pressure medium, a normally open electric switch, expansion means forming a part of said closed fluid system and responsive to a predetermined rate of increase in the pressure of said medium to close said electric switch and a rigid air-tight housing forming a chamber isolated from said closed fluid system and surrounding said expansion means for isolating the closed fluid system from the effects of external changes in pressure.

GARTH L. BAIR.

REFERENCES CITED

The following references are of record in the file of this patent:

UNITED STATES PATENTS

| Number | Name | Date |
|---|---|---|
| 343,691 | Baulieu | June 15, 1886 |
| 891,743 | Smith | June 23, 1908 |
| 1,219,723 | Gracey et al. | Mar. 20, 1917 |
| 1,665,381 | Siddall et al. | Apr. 10, 1928 |

FOREIGN PATENTS

| Number | Country | Date |
|---|---|---|
| 568,898 | France | Oct. 2, 1926 |